United States Patent
Okawa et al.

(10) Patent No.: US 7,727,412 B2
(45) Date of Patent: Jun. 1, 2010

(54) DRY ETCHING METHOD

(75) Inventors: Shuichi Okawa, Chuo-ku (JP); Kazuhiro Hattori, Chuo-ku (JP); Mitsuru Takai, Chuo-ku (JP)

(73) Assignee: TDK Corporation, Tokyo (JP)

( * ) Notice: Subject to any disclaimer, the term of this patent is extended or adjusted under 35 U.S.C. 154(b) by 516 days.

(21) Appl. No.: 10/542,055

(22) PCT Filed: Jun. 11, 2004

(86) PCT No.: PCT/JP2004/008233

§ 371 (c)(1), (2), (4) Date: Jul. 12, 2005

(87) PCT Pub. No.: WO2005/001919

PCT Pub. Date: Jun. 1, 2005

(65) Prior Publication Data

US 2006/0108323 A1 May 25, 2006

(30) Foreign Application Priority Data

Jun. 30, 2003 (JP) .............................. 2003-188467

(51) Int. Cl.
*C23F 1/00* (2006.01)
(52) U.S. Cl. ...................................................... 216/41
(58) Field of Classification Search .................. 216/41, 216/58, 67, 74; 204/192 E; 156/643; 365/39; 427/127, 128, 130; 360/131, 135; 126/46, 126/47, 49, 37
See application file for complete search history.

(56) References Cited

U.S. PATENT DOCUMENTS

| | | | | |
|---|---|---|---|---|
| 4,299,680 A | * | 11/1981 | Fontana et al. | 204/192.34 |
| 6,057,081 A | * | 5/2000 | Yunogami et al. | 430/313 |
| 6,174,151 B1 | * | 1/2001 | Yarr | 418/171 |
| 6,184,151 B1 | * | 2/2001 | Adair et al. | 438/743 |
| 2001/0053610 A1 | * | 12/2001 | Athavale et al. | 438/710 |
| 2003/0063762 A1 | * | 4/2003 | Tajima et al. | 381/111 |
| 2003/0104697 A1 | * | 6/2003 | Chang et al. | 438/689 |
| 2003/0143858 A1 | * | 7/2003 | Mathuni et al. | 438/710 |

FOREIGN PATENT DOCUMENTS

| | | |
|---|---|---|
| JP | 62-222657 | 9/1987 |
| JP | 62-222658 | 9/1987 |
| JP | 62-279633 | 12/1987 |

(Continued)

OTHER PUBLICATIONS

Z. Kowalski et. al. "microelectronic and medical applications of an ion beam milling system", Journal of materials science 18(1983) 741-752.*

*Primary Examiner*—Michael Cleveland
*Assistant Examiner*—Tabassom Tadayyon Eslami
(74) *Attorney, Agent, or Firm*—Oliff & Berridge, PLC

(57) ABSTRACT

A dry etching method and the like that can process a layer to be processed in a fine pattern to have a peripheral portion of an angular shape, are described. This dry etching method forms a step portion 21 along a peripheral portion of a first mask layer 20 that corresponds to an outline of an etching pattern in such a manner that the step portion 21 projects toward an opposite side to a magnetic thin layer 18 (layer to be processed).

11 Claims, 11 Drawing Sheets

FOREIGN PATENT DOCUMENTS

| | | |
|---|---|---|
| JP | 2-72624 | 3/1990 |
| JP | 10-148927 | 6/1998 |
| JP | 2000-322710 | 11/2000 |
| JP | 2002-42329 | 2/2002 |
| JP | 2002-359138 | 12/2002 |

* cited by examiner

DRY ETCHING METHOD

TECHNICAL FIELD

The present invention relates to a dry etching method used for processing semiconductors, information recording media, and the like, and to a method for manufacturing an information recording medium.

BACKGROUND ART

As a conventional fine processing technology for semiconductors, information recording media, and the like, a dry etching method is known which includes a mask layer processing step of forming a mask layer having a predetermined pattern on a layer to be processed, and a layer-to-be-processed processing step of removing an exposed portion of the layer to be processed by dry etching so as to process the layer to be processed in the aforementioned pattern.

There are various types of dry etching. Reactive ion etching, that is one type of dry etching, can increase a selection ratio of an etching rate of the layer to be processed and an etching rate of the mask by appropriately selecting types of a reactive gas and a material for the mask. Thus, reactive ion etching can make the mask layer thinner and process a fine pattern. For that reason and the like, reactive etching is widely used at present.

Reactive ion etching is a technology that has developed mainly in the field of semiconductor fabrication. This technology can be also used in other fields such as fabrication of an information recording medium including a magnetic layer, for example (see Japanese Patent Laid-Open Publication No. Hei 12-322710, for example).

However, although the layer to be processed can be patterned in a fine pattern by the technique of dry etching, it is difficult to process the layer to be processed 100 in a shape in which its peripheral portion 100A corresponding to the outline of the pattern is angular, as shown in FIG. 21(A). In fact, the peripheral portion of the layer to be processed is processed in a rounded shape. Thus, a certain degree of disagreement occurs between a desired processed shape and the actually processed shape.

More specifically, in dry etching, not only the layer to be processed is removed, but also the mask layer on the layer to be processed is etched and removed little by little. In the etching of the mask layer 102, as shown in FIG. 21(B), a peripheral portion 102A is removed faster than other portions. Thus, as shown in FIG. 21(C), the peripheral portion 100A of the layer to be processed 100 is exposed from the mask layer 102 faster than other portions of the layer to be processed 100. Therefore, the layer to be processed 100 is removed faster in the peripheral portion 100A than in the other portions, so that the peripheral portion 100A is processed in a rounded shape, as shown in FIG. 21D. Such a phenomenon usually occurs in dry etching. Especially, such a phenomenon is more apparent in reactive ion etching.

In dry etching, a part of ions is incident on the layer to be processed at an angle with respect to that layer. Therefore, a side face of the layer to be processed 100 is in the shadow of the mask with respect to the ions incident on the layer to be processed at an angle, so that it is processed to be tapered.

As the pattern becomes finer, an effect of the aforementioned disagreement of the processed shape on properties of a product and the like tends to become relatively larger. For example, in an information recording medium and an apparatus for recording and/or reproducing information, the effect of the aforementioned disagreement of the processed shape on the properties of the product and the like, becomes a problem in many cases. Thus, needs of a dry etching technique that can process the layer to be processed in a shape in which its peripheral portion is angular have increased.

The aforementioned problem can be avoided if the mask layer having a sufficient thickness is formed on the layer to be processed in advance, considering that the peripheral portion of the mask layer is removed faster than the other portions. However, the mask layer is also processed by dry etching in a predetermined pattern generally, so that the side face of the patterned mask layer is tapered. Thus, in the case where the pitch of the pattern is small, when the mask layer is thick, a concave portion having a V-shaped cross section is formed in the mask layer or the layer to be processed by continuous side faces of the mask layer or the layer to be processed. After the V-shaped concave portion is formed, etching no longer progresses. Thus, it may be impossible to process the layer to be processed to a desired depth.

DISCLOSURE OF THE INVENTION

Therefore, the present invention was made in view of the aforementioned problems. It is an object of the present invention to provide a dry etching method and the like, that can process a layer to be processed in a fine pattern to have a peripheral portion of an angular shape.

The present invention can overcome the aforementioned problems by forming a step portion along a peripheral portion of a mask layer corresponding to an outline of a pattern, in such a manner that the step portion projects toward an opposite side to a layer to be processed.

By doing so, if erosion of the mask layer progresses faster in its peripheral portion than its other portions during dry etching of the layer to be processed, a time at which the peripheral portion of the layer to be processed is exposed is delayed by the amount corresponding to the existence of the step portion. Thus, it is possible to prevent the peripheral portion of the layer to be processed from being removed faster than the other portions thereof. Therefore, the layer to be processed can be processed to have the peripheral portion of an angular shape.

During the process for completing the present invention, it was considered that it was difficult to form the step portion along the peripheral portion of the mask layer when the pattern was fine. However, the inventor found a technique that was able to form the step portion along the peripheral portion of the mask layer even if the pattern was fine, through trial and error studies of various dry etching techniques, so that the inventor completed the present invention.

The foregoing object can be achieved by the invention as described below.

(1) A dry etching method comprising: a mask layer processing step of processing a mask layer on a layer to be processed, in a predetermined pattern; and a layer-to-be-processed processing step of removing an exposed portion of the layer to be processed by dry etching to process the layer to be processed in the pattern, wherein the mask layer processing step forms a step portion along a peripheral portion of the mask layer corresponding to an outline of the pattern, the step portion projecting toward an opposite side to the layer to be processed.

(2) A dry etching method according to (1), wherein the mask layer processing step includes: a second mask layer processing step of forming, while the mask layer is used as a first mask layer, a second mask layer on the first mask layer and processing the second mask layer in the pattern; and a first mask layer processing step of removing an exposed portion of the first mask layer by ion beam etching and forming the step portion along the peripheral portion of the first mask layer by causing particles that are removed and scattered by the ion beam etching to adhere to a side face of the second mask layer.

(3) A dry etching method according to (2), wherein the first mask layer processing step sets at least one of an etching condition that is adjustment of a beam voltage of the ion beam etching and an etching condition that is selection of a type of a gas, to control a shape of the step portion.

(4) A dry etching method according to (2) or (3), wherein the second mask layer processing step uses a resist material as a material for the second mask layer.

(5) A dry etching method according to any one of (1) to (4), wherein further comprising an intermediate layer formation step of forming an intermediate layer between the mask layer and the layer to be processed before the mask layer processing step, and an intermediate layer removal step of removing the intermediate layer after the layer-to-be-processed processing step.

(6) A dry etching method according to (1), wherein the mask layer processing step includes: a second mask layer formation step of forming a second mask layer directly or indirectly on the layer to be processed in a pattern in which a convexo-concave pattern is opposite to that of the pattern; a first mask layer formation step of depositing a first mask layer on the second mask layer and a bottom face of a groove in the second mask layer to form the first mask layer having a step portion projecting along a side face of the groove; and a second mask layer removal step of dissolving the second mask layer with dissolving liquid to remove the second mask layer and making the first mask layer as the mask layer.

(7) A dry etching method according to any one of (1) to (6), wherein the layer-to-be-processed processing step processes the layer to be processed by reactive ion etching.

(8) An information recording medium in which an information recording layer is divided into a number of recording elements and peripheral portions of the recording elements are processed in an angular shape, by using the dry etching method according to any one of (1) to (7) while the information recording layer is regarded as the layer to be processed.

In the present specification, the term "ion beam etching" is used to collectively mean a processing method that makes an ionized gas incident on a subject to be processed to remove the subject to be processed, such as ion trimming. Please note that the term "ion beam etching" is not limited to a processing method that converges an ion beam and makes it incident on the subject to be processed.

Moreover, the term "angular shape" is not limited to a shape having an angle that is geometrically precise. This term is also used to mean a shape that does not have an excessively rounded portion, in other words, to mean a shape including a slightly rounded shape that can provide good properties of a product.

BRIEF DESCRIPTION OF THE DRAWINGS

[FIG. 15] is a side cross-sectional view schematically showing the shape of the same sample in which the first mask layer is formed on a bottom face of a groove and the like.

BEST MODE FOR CARRYING OUT THE INVENTION

Preferred embodiments of the present invention will be now described in detail with reference to the drawings.

Figure 1:
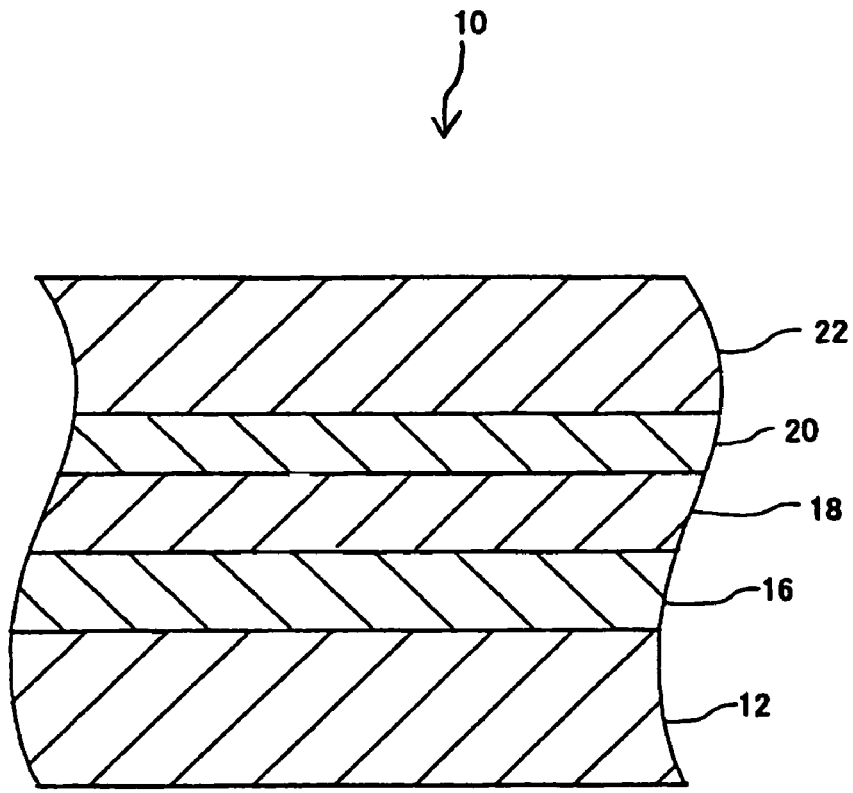
[FIG. 1] is a side cross-sectional view schematically showing a starting structure of a sample according to a first embodiment of the present invention.
Figure 2:
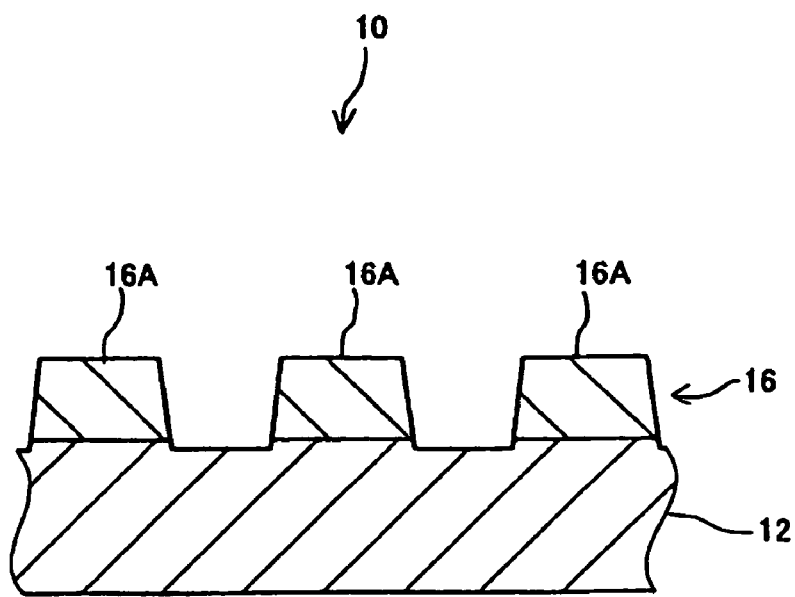
[FIG. 2] is a side cross-sectional view schematically showing the completed structure of the sample that is obtained by processing the starting structure of the same sample.

The present embodiment relates to a dry etching method for performing processing such as dry etching, for a sample having a starting structure as shown in FIG. 1, so as to process a magnetic thin layer (layer to be processed) in a predetermined line-and-space pattern as shown in FIG. 2. This dry etching method has features in the shape of a mask covering the magnetic thin layer and a method of forming the mask. Except for those points, this dry etching method is the same as the conventional dry etching method. Therefore, the description of this dry etching method is partially omitted appropriately.

The starting structure of the sample 10 includes a magnetic thin layer 16, an intermediate layer 18, a first mask layer 20, and a second mask layer 22. They are formed on a glass substrate 12 in that order.

The magnetic thin layer 16 has a thickness of 5 to 30 nm and is formed of a CoCr (cobalt chrome) alloy.

The intermediate layer 18 has a thickness of 5 to 50 nm and is formed of TiN (titanium nitride).

The first mask layer 20 has a thickness of 5 to 30 nm and is formed of Ni (nickel).

The second mask layer 22 has a thickness of 30 to 300 nm and is formed of an electron beam resist (ZEP520, ZEON Corporation).

Figure 3:
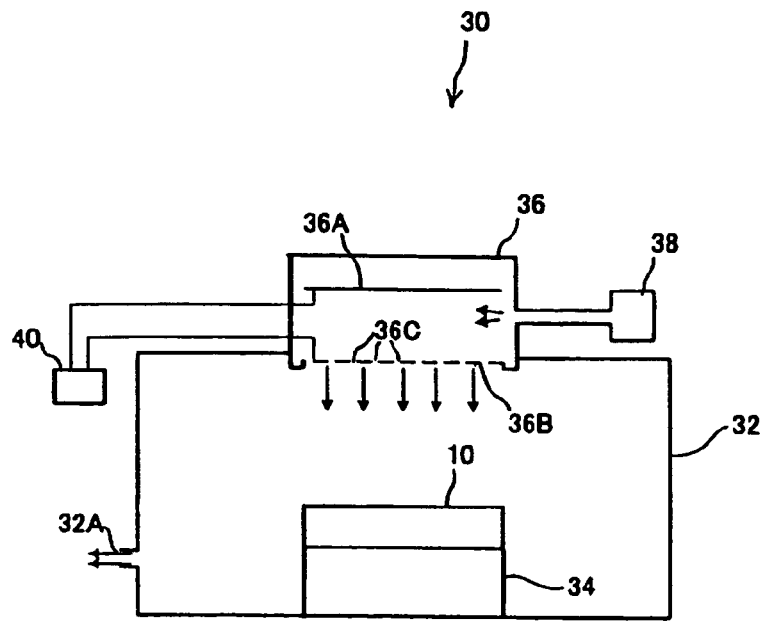
[FIG. 3] is a side view schematically showing a structure of an ion beam etching apparatus used for processing the same sample, partially including a block diagram.

The sample 10 is processed by an ion beam etching apparatus shown in FIG. 3, or the like.

The ion beam etching apparatus 30 includes a vacuum chamber 32, an ESC (electrostatic chuck) stage electrode 34 for placing the sample 10 within the vacuum chamber 32, an ion gun 36 for generating ions and making them incident on the stage electrode 34, a gas supply 38 for supplying argon gas to the ion gun 36, and a power supply 40 for applying a beam voltage to the ion gun 36. The vacuum chamber 32 is provided with a discharge vent 32A for discharging argon gas.

The ion gun 36 includes an anode 36A connected to the power supply 40 by wire, and a cathode 36B having a number of fine holes 36C formed therein. Through those fine holes 36C, ionized argon gas is emitted.

Figure 4:
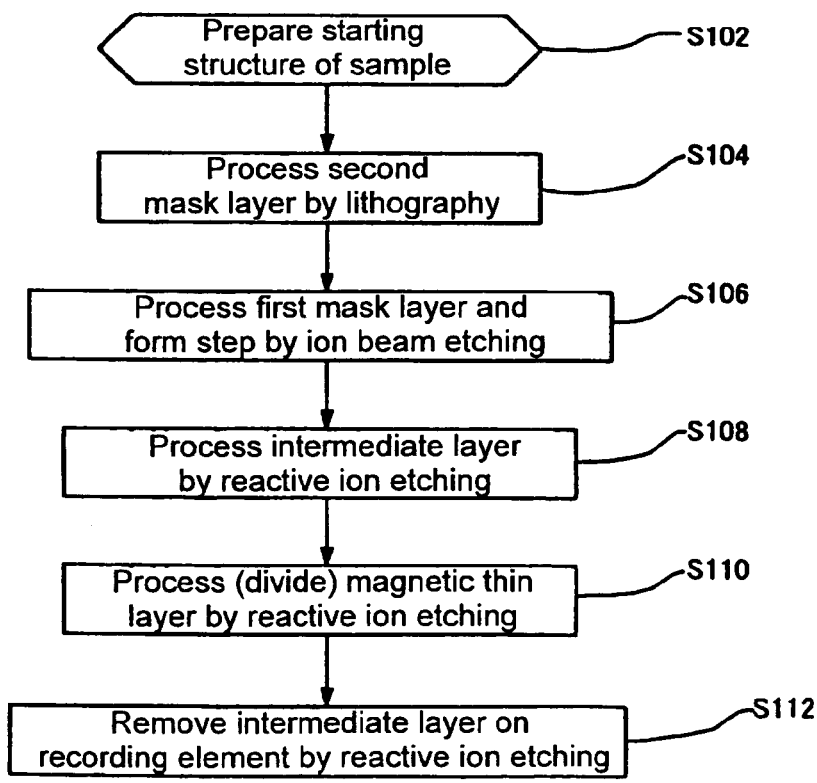
[FIG. 4] is a flowchart of processing of the same sample.

Next, a processing method for processing the sample 10 is described, referring to the flowchart shown in FIG. 4.

First, a sample 10 having a starting structure shown in FIG. 1 is prepared (S102). The starting structure of the sample 10 is obtained by forming a magnetic thin layer 16, an intermediate layer 18, and a first mask layer 20 on a glass substrate 12 by sputtering in that order and then forming a second mask layer 22 by spin-coating.

Figure 5:
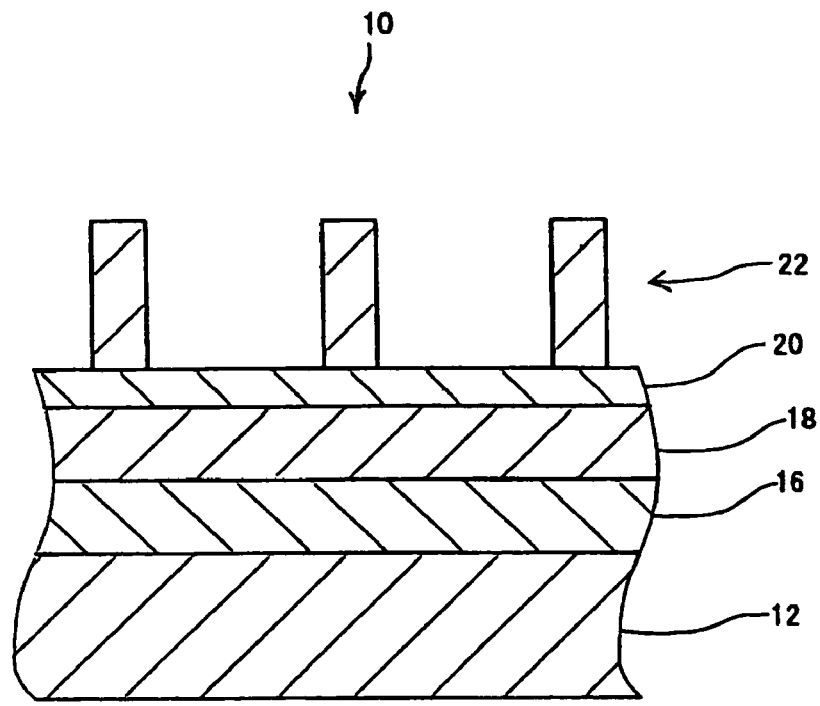
[FIG. 5] is a side cross-sectional view of a shape of the sample in which a second mask layer is divided in a predetermined pattern.

Then, a region of the second mask layer 22 in the above starting structure of the sample 10, which corresponds to a space of the aforementioned pattern, is exposed to an electron beam by using an electron beam exposure apparatus (not shown). The thus exposed region is then removed by performing development for five minutes at a room temperature by using ZED-N50 (ZEON Corporation). In this manner, a number of grooves are formed with fine intervals, as shown in FIG. 5 (S104).

Figure 6:
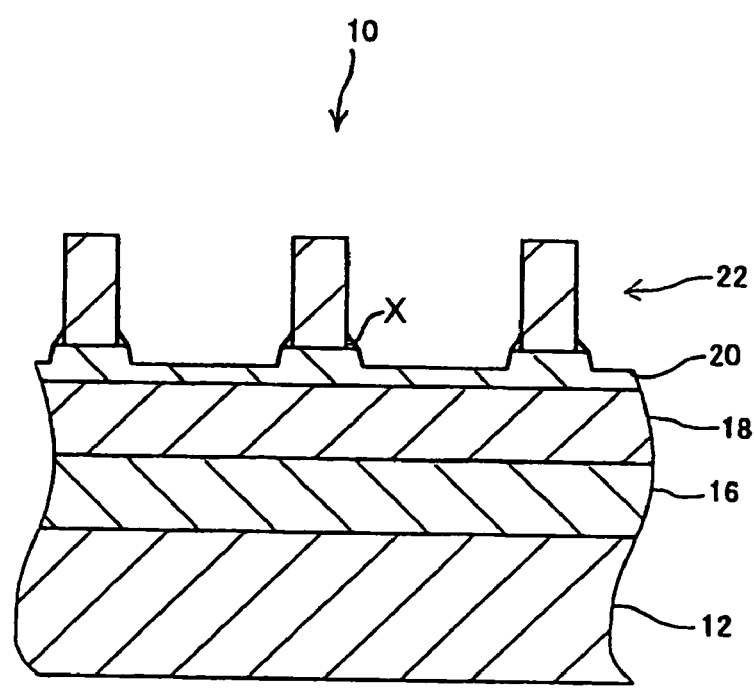
[FIG. 6] is a side cross-sectional view schematically showing the shape of the sample in which a step portion is formed while a first mask layer on a bottom face of a groove is removed.

Then, the first mask layer 20 on a bottom face of the groove is removed by using the ion beam etching apparatus 30, as shown in FIG. 6 (S106). More specifically, the sample 10 is placed and fixed onto the ESC stage electrode 34. When argon gas is supplied to the ion gun 36 and is ionized and the power supply 40 applies a beam voltage between the anode 36A and the cathode 36B, argon gas gets close to the cathode 36B and is then discharged to the inside of the vacuum chamber 32 through the fine holes 36C. The discharged argon gas is incident on the sample 10. In this manner, argon gas collides against the sample 10 and removes the surface of the first mask layer 20. Argon gas also removes the surface of the second mask layer 22.

During the removal of the first mask layer 20, a part of particles that have been removed and scattered from the first mask layer 20 adheres as an adhering matter X to the side face of the second mask layer 22 near the bottom face of the groove, as shown in FIG. 6. The adhering matter X forms a step portion along the peripheral portion of the first mask layer 20 as described later. Please note that grooves each having a narrower width than that of the grooves formed in the second mask layer 22 are formed in the first mask layer 20 because of a tapered angle of the side face of the groove.

Figure 7:
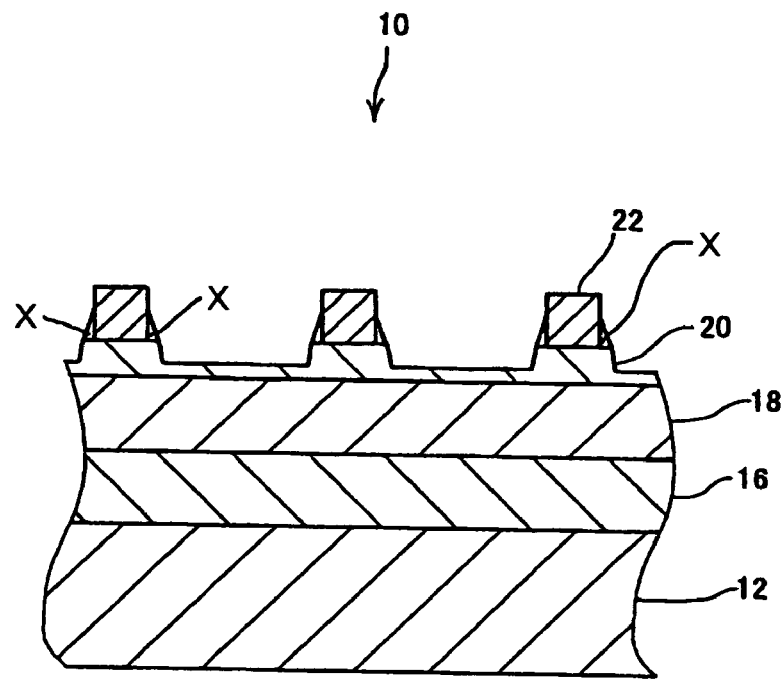
[FIG. 7] is a side cross-sectional view schematically showing the shape of the sample in which the step portion grows while the first mask layer on the bottom face of the groove is further removed.
Figure 8:
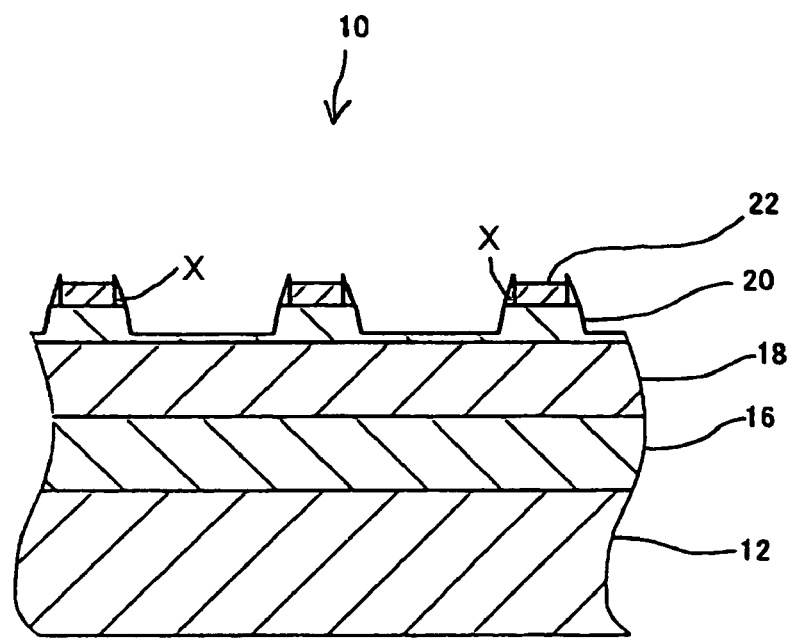
[FIG. 8] is a side cross-sectional view schematically showing the shape of the sample in which the second mask layer between the step portions is removed to be lower than the step portions.

As ion beam etching progresses, as shown in FIGS. 7 and 8, the first mask layer 20 on the bottom face of the groove and the second mask layer 22 in a region other than the groove gradually become thinner, whereas the adhering matter X on the side face of the second mask layer 22 increases and grows. The shape of the adhering matter X can be controlled by a setting condition of ion beam etching. For example, when the beam voltage of the power supply 40 is made larger, the adhering matter X can be made to grow more.

Figure 9:
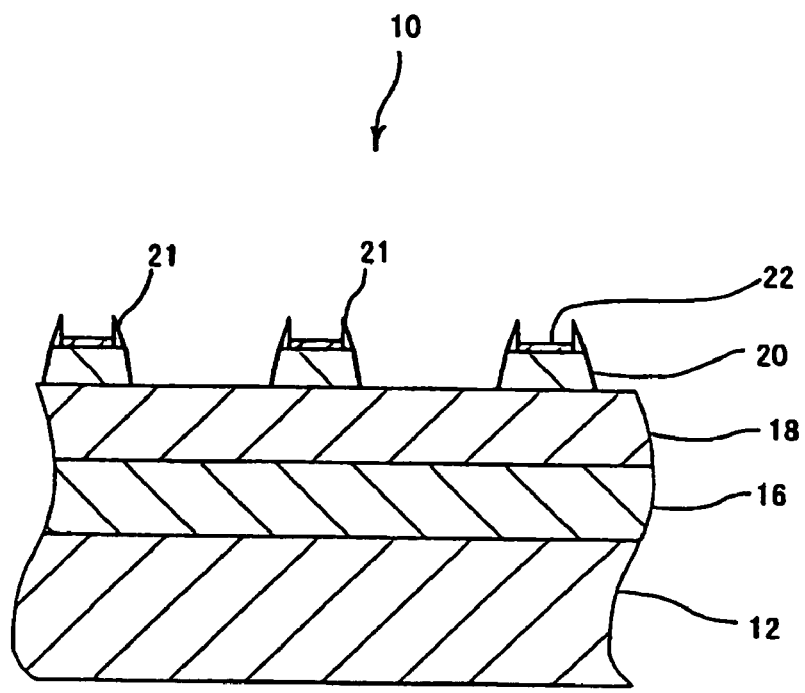
[FIG. 9] is a side cross-sectional view schematically showing the shape of the sample in which the first mask layer on the bottom face of the groove is completely removed.

When ion beam etching progresses further, as shown in FIG. 9, the first mask layer 20 on the bottom face of the groove is completely removed so that the first mask layer 20 is patterned into the aforementioned pattern. In addition, the adhering matter X is left as a step 21 along the peripheral portion of the first mask layer 20 that corresponds to the outline of the aforementioned pattern. Thus, the step portion 21 which projects toward an opposite side to the magnetic thin layer 16 is formed along the peripheral portion of the first mask layer 20. Please note that although most of the second mask layer 22 is removed, a small part thereof is left between the step portions 21.

The reason why the adhering matter X is left along the peripheral portion of the first mask layer 20 is not necessarily apparent. However, this reason is generally estimated as follows. As shown in FIGS. 6 and 7, in the case where the height of the adhering matter X (i.e., the step portion 21) is higher than that of the second mask layer, the adhering matter X increases and grows. On the other hand, as shown in FIG. 8, when the height of the second mask layer becomes lower than that of the adhering matter X etching of the adhering matter X starts. However, a rate at which the height of the adhering matter X decreases by etching is smaller, as compared with at least the second mask layer, because a part of particles that are removed and scattered from the first mask layer 20 adheres to the adhering matter X again. As a result, as shown in FIG. 9, the adhering matter X is finally left along the peripheral portion of the first mask layer 20. It is considered that the first mask layer 20 having the step portion 21 along its peripheral portion is formed in the aforementioned manner.

Figure 10:
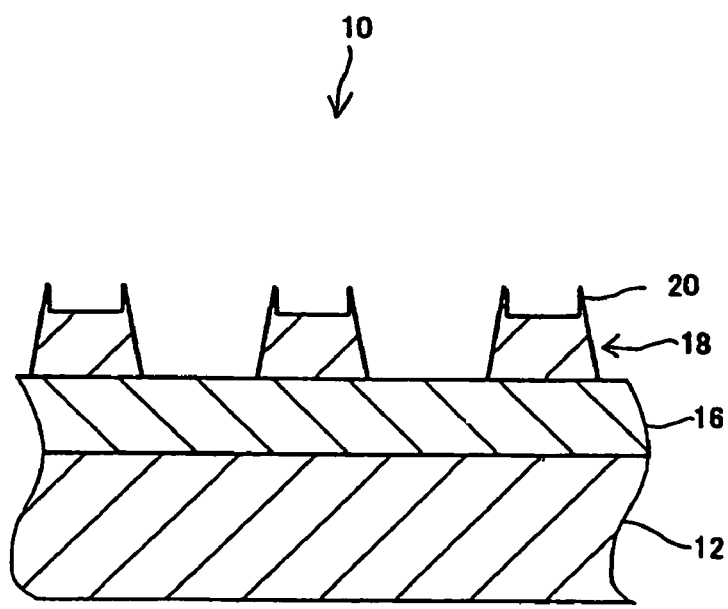
[FIG. 10] is a side cross-sectional view schematically showing the shape of the sample in which an intermediate layer on the bottom face of the groove is completely removed.

Next, the intermediate layer 18 on the bottom face of the groove is removed by reactive ion etching using $CF_4$ (carbon tetrafluoride) gas or $SF_6$ (sulfur hexafluoride) gas (i.e., halogen reactive gas) as a reactive gas, as shown in FIG. 10 (S108). The second mask layer 22 is completely removed in a short time after the start of the etching, because it has low etching resistance to a halogen reactive gas. The first mask layer 20 is also removed in that reactive ion etching. However, the first mask layer 20 is gradually removed after the start of the etching, because it has high etching resistance to a halogen reactive gas. During this etching of the first mask layer 20, the etching progresses faster in the peripheral portion than in other portions. However, since the step portion 21 is formed along the peripheral portion 20 of the first mask layer 20, the other portions of the first mask layer 20 are removed faster than the peripheral portion. Thus, the first mask layer 20 is left on the peripheral portion of the intermediate layer 18 and a step portion is formed along the peripheral portion of the intermediate layer 18. Although the first mask layer 20 is also left in a portion of the intermediate layer 18 other than the peripheral portion thereof, the amount of the first mask layer 20 thus left is very small (not shown in the drawings).

Figure 11:
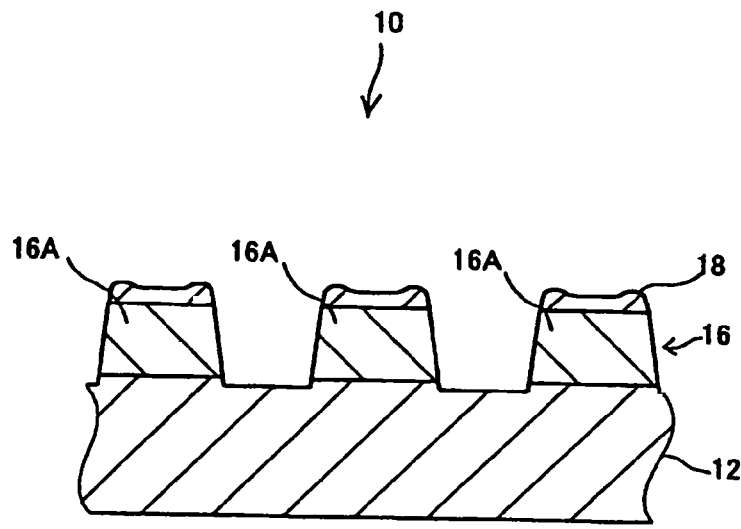
[FIG. 11] is a side cross-sectional view schematically showing the shape of the sample in which a magnetic thin layer is divided.

Next, the magnetic thin layer 16 on the bottom face of the groove is removed by reactive ion etching using CO gas and $NH_3$ gas as a reactive gas, as shown in FIG. 11 (S110). Thus, the magnetic thin layer 16 is divided into a number of recording elements 16A.

The intermediate layer 18 is gradually removed after the start of the etching, because it has high etching resistance to CO gas. During the etching of the intermediate layer 18, the peripheral portion thereof is etched faster than the other portions. However, since the first mask layer 20 is left as the step portion along the peripheral portion of the intermediate layer 18, the intermediate layer 18 is processed while the thickness difference between the peripheral portion and the other portions is reduced. As a result, the intermediate layer 18 is left on each of the recording elements 16A in a shape in which the peripheral portion slightly rises from the other portions. In other words, the upper surface of the recording element 16A is not exposed. Therefore, in the recording element 16A, the peripheral portion cannot be removed faster than the other portions. Thus, the recording element 16A can be processed to have an angular shape in which its peripheral portion is not rounded.

The term "angular shape" is not limited to a shape having a geometrically precise angle but is used to mean a shape which is not excessively rounded, i.e., a slightly rounded shape that provides good properties of a product, as described above. For example, in a case of a hard disc, a shape in which an upper surface includes a flat portion having a width sufficient for recording and reproduction can correspond to the "angular shape," even if that shape includes the peripheral portion that is slightly rounded. A specific shape is determined in an appropriate manner, depending on a type of a magnetic recording medium, areal recording density, a track pitch, a track width, a recording and reproduction head, and the like.

Next, the intermediate layer 18 remaining on the upper surface of the recording element 16A is completely removed by reactive ion etching using $CF_4$ gas or $SF_6$ gas (S112) Alternatively, the intermediate layer 18 remaining on the upper surface of the recording element may be removed by a reactive ashing apparatus (not shown in the drawings) using $CF_4$ gas or $SF_6$ gas. By removing the intermediate layer 18 in this manner, the step portion formed by dry etching such as ion beam etching, is surely removed without being transferred onto the recording element 16A.

Since the intermediate layer 18 left on the upper surface of the recording element 16A is thin, it can be removed in a short time. Moreover, since the etching rate of the recording element 16A for a halogen reactive gas is low, the recording element 16A cannot be processed to have a peripheral portion of a rounded shape.

In this manner, the processing is completed, so that the sample 10 having the structure shown in FIG. 2 is obtained.

As described above, by forming the step portion 21 along the peripheral portion of the first mask layer 20, it is possible to prevent the peripheral portion of the magnetic thin layer 16 from being exposed faster than the other portions thereof, and it is therefore possible to process the magnetic thin layer 16 in a shape in which its peripheral portion is angular.

Moreover, by forming the step portion 21 along the peripheral portion of the first mask layer 20, it is possible to prevent the peripheral portion of the magnetic thin layer 16 from being exposed faster than the other portions thereof without making the first mask layer 20 thick. This enables the magnetic thin layer 16 to be processed in a finer pattern.

In addition, ion beam etching can form the step portion 21 while processing the first mask layer 20 in a pattern. Thus, the dry etching method of the present embodiment has good production efficiency.

Moreover, ion beam etching can use a resist material as a mask directly, and does not require any mask obtained by transferring a resist material, unlike reactive ion etching. Thus, the dry etching method of the present embodiment is good in production efficiency and in transfer precision of the etching pattern.

In the present embodiment, the second mask layer 22 is processed in a predetermined pattern by using an electron beam exposure apparatus. However, a predetermined convexo-concave pattern may be transferred onto the second mask layer 22 by imprinting, for example, so that the second mask layer 22 having the transferred pattern is used as a mask for ion beam etching of the first mask layer 20. The material for the second mask layer is not limited specifically, as long as it has a relatively low etching rate for ion beam etching.

In the present embodiment, the first mask layer 20 is formed of Ni. However, the present invention is not limited thereto. The material for the first mask layer may be any material, as long as it has a low etching rate for dry etching that processes the intermediate layer 18. Similarly, the material for the intermediate layer 18 is not limited specifically. Any material may be used for the intermediate layer 18, as long as it has a low etching rate for dry etching that processes the magnetic thin layer 16.

In the present embodiment, the intermediate layer 18 is formed between the magnetic thin layer 16 and the first mask layer 20. However, the present invention is not limited thereto. The first mask layer 20 may be formed directly on the magnetic thin layer 16. In this case, as the material for the first mask layer 20, a material having a low etching rate for dry etching that processes the magnetic thin layer 16 can be chosen.

In the present embodiment, the magnetic thin layer 16 is formed of a CoCr alloy. However, the present invention is not limited thereto. The present invention can be applied to processing of a magnetic thin layer formed from another material, for example, a magnetic thin layer formed of another alloy including an iron group element (Co, Fe (iron), Ni) or a magnetic thin layer formed by a multilayer structure of those elements.

In the present embodiment, CO gas with $NH_3$ gas added thereto is used as the reactive gas of reactive ion etching for processing the magnetic thin layer 16. However, the present invention is not limited thereto. The magnetic thin layer 16 may be processed by using CO gas with another nitrogen-containing compound gas such as amine gas that has an action of suppressing decomposition of CO, as a reactive gas.

In the present embodiment, $CF_4$ gas or $SF_6$ gas is used as the reactive gas of reactive ion etching for processing and removing the intermediate layer 18. However, the present invention is not limited thereto. The intermediate layer 18 may be processed and removed by using another halogen reactive gas.

In the present embodiment, while the exposed portion of the first mask layer 20 is removed by ion beam etching using argon gas, the step portion 21 is formed by making particles that are removed and scattered from the first mask layer 20 adhere to the side face of the second mask layer 22. However, the present invention is not limited thereto. For example, ion beam etching using another rare gas such as Kr (krypton) or Xe (xenon) may remove the exposed portion of the first mask layer 20 and form the step portion 21. In the present embodiment, the beam voltage is described as an exemplary setting condition of ion beam etching for controlling the shape of the step portion 21. Alternatively, the shape of the step portion 21 can be controlled by appropriately selecting the type of the gas.

Moreover, another dry etching method such as reactive ion etching, can also form the step portion along the peripheral portion of the mask while removing the exposed portion of the mask layer, if the etching condition is appropriately adjusted.

Alternatively, the step portion 21 can be formed along the peripheral portion of the first mask layer 20 by a lift-off method, as described in a second embodiment of the present invention that will be described below.

Figure 12:
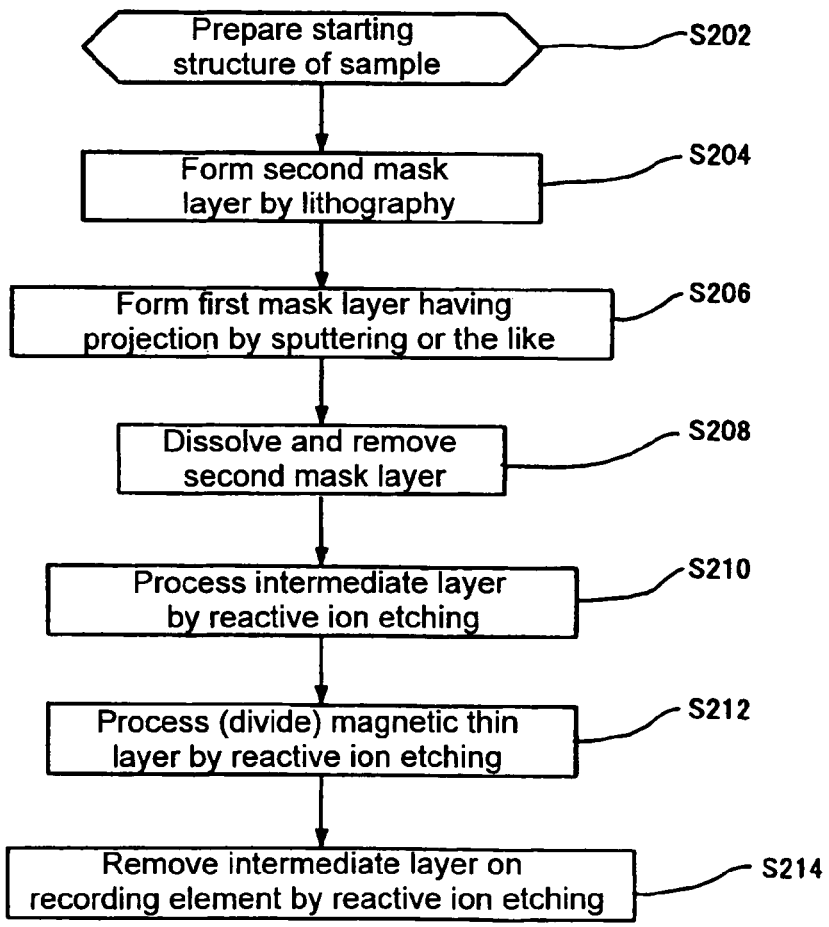
[FIG. 12] is a flowchart of processing of a sample according to a second embodiment of the present invention.
Figure 13:
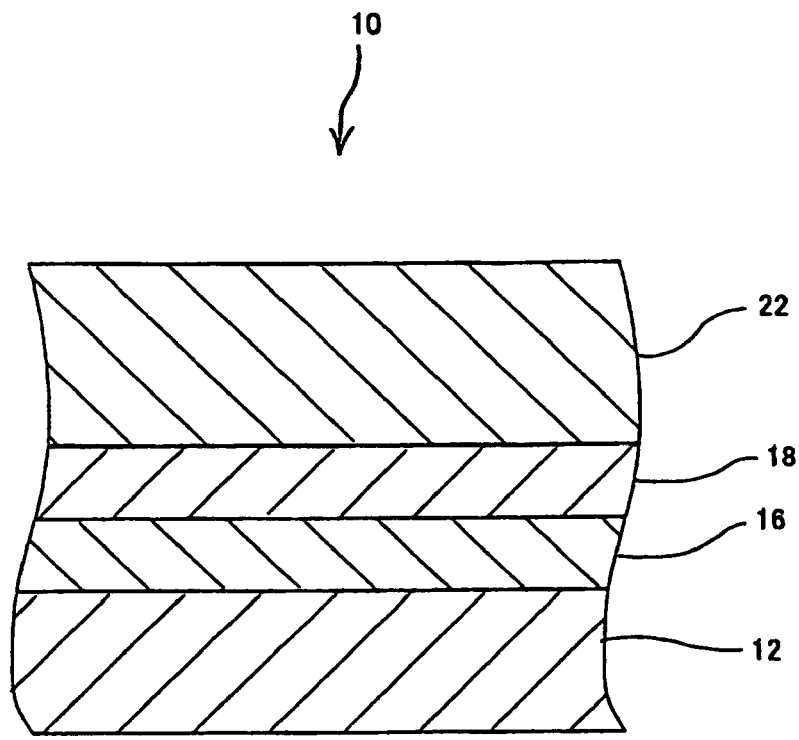
[FIG. 13] is a side cross-sectional view schematically showing the starting structure of the same sample.

In the second embodiment, as shown in the flowchart of FIG. 12, the starting structure of the sample 10 shown in FIG. 13 is formed by forming the magnetic thin layer 16, the intermediate layer 18, and the second mask layer 22 on the glass substrate 12 in that order (S202), and the first mask layer 20 is formed in a later step.

Figure 14:
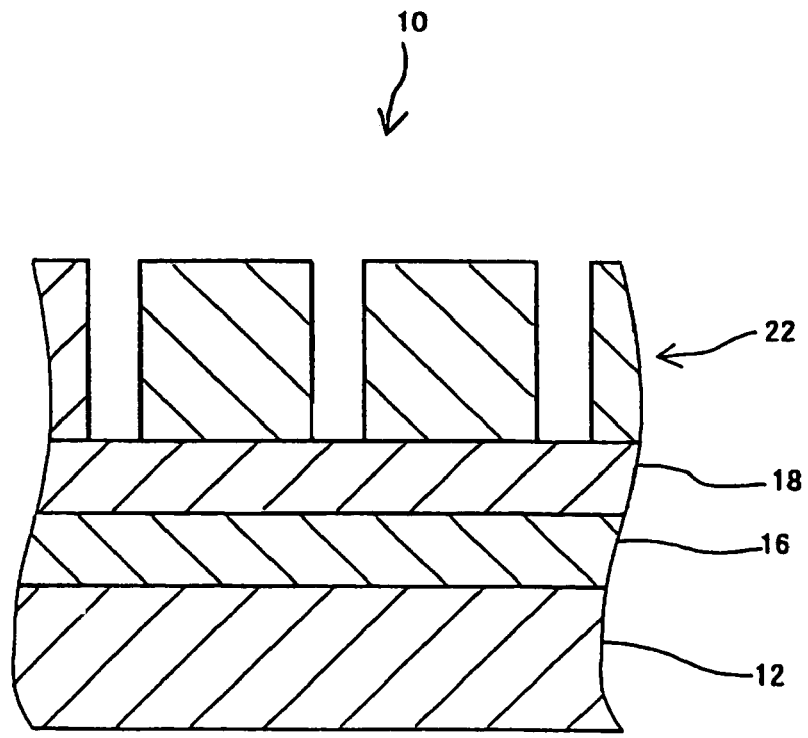
[FIG. 14] is a side cross-sectional view schematically showing the shape of the same sample in which the second mask layer is divided in a predetermined pattern.

First, a region of the second mask layer 22 is exposed to an electron beam by using an electron beam exposure apparatus (not shown). In this exposure step, the exposed region corresponds to a line of the aforementioned pattern, contrary to the first embodiment. Then, the exposed region is removed by performing development for five minutes at a room temperature by using ZED-N50 (ZEON Corporation), so that a number of grooves are formed with fine intervals, as shown in FIG. 14 (S204).

Figure 15:
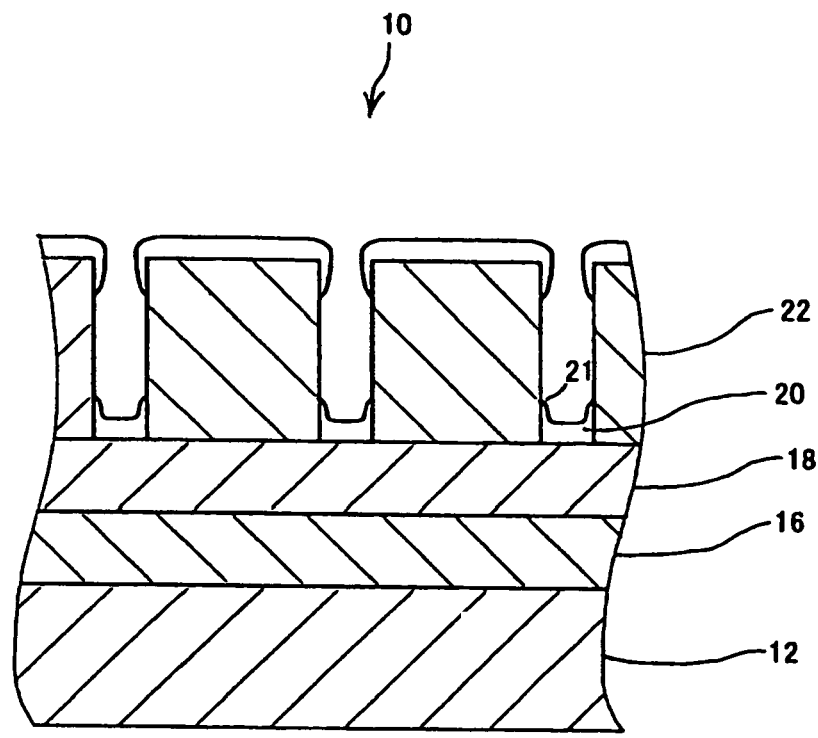

Next, the first mask layer 20 is deposited on the second mask layers 22 and in the grooves between the second mask layers 22 by sputtering, CVD (Chemical Vapor Deposition), or the like (S206). As shown in FIG. 15, the first mask layer 20 is formed near the upper end of the second mask layer 22 and on the exposed portion of the intermediate layer 18 between the second mask layers 22. At the same time, the first mask layer 20 is also formed on the side faces of the second mask layer 22 near the bottom face of the groove. Thus, the first mask layer 20 on the bottom face of the groove is formed in a shape having a step portion along its peripheral portion. Please note that almost no first mask layer 20 adheres to the intermediate portion of the side face of the second mask layer 22 in the vertical direction.

The reason why the first mask layer 20 is formed in a shape having the step portion along its peripheral portion is not necessarily apparent. However, that reason is generally estimated as follows. Considering sputtering as an example, there are sputtered particles getting close to the sample 10 at an angle with respect to a direction perpendicular to the sample 10. Those particles adhere to the side face of the second mask layer 22 before adhering to the bottom face of the groove. However, those particles cannot reach the intermediate portion of the side face of the second mask layer 22 in the vertical direction because that portion is blocked by the first mask layer formed near the upper end of the second mask layer 22. Thus, the first mask layer 20 seldom or never adheres to the intermediate portion of the side face of the second mask layer 22 in the vertical direction, but adheres to the portion of the second mask layer 22 near the bottom face of the groove in a concentrated manner. It is considered that the first mask layer 20 is formed in a shape having the step portion 21 along its peripheral portion in the manner described above.

Figure 16:
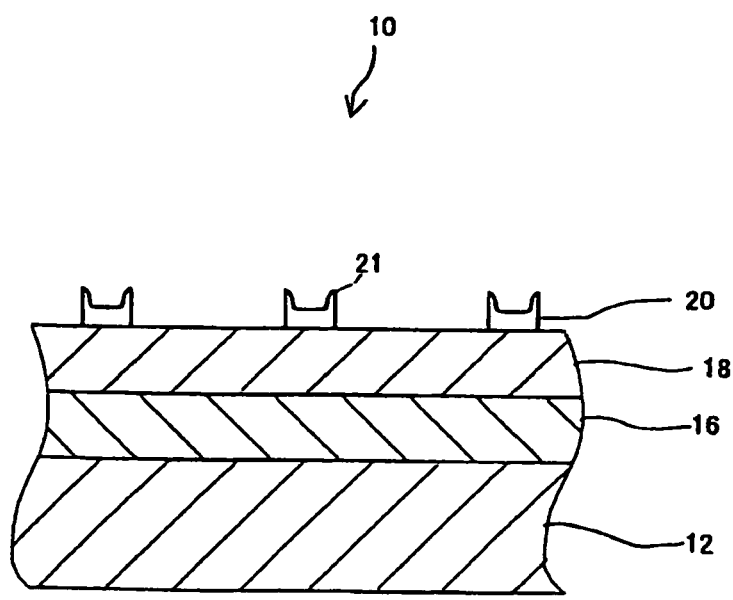
[FIG. 16] is a side cross-sectional view schematically showing the shape of that sample in which the second mask layer is removed and the first mask layer having a step portion along its peripheral portion is left.

Then, the sample 10 is dipped in dissolving liquid so that the second mask layer 20 is dissolved and removed. As a result, as shown in FIG. 16, the first mask layer 20 having the step portion 21 along its peripheral portion is left on the intermediate layer 18 (S208). Please note that the first mask layer 20 formed near the upper end of the second mask layer 22 is removed together with the second mask layer 22.

Then, by performing Steps S210 to S214 that are similar to Steps S108 to S112 in the first embodiment (see FIGS. 10 and 11), the sample 10 having the structure shown in FIG. 2 is obtained.

In the first and second embodiments, the sample 10 is a sample for test having a structure in which the magnetic thin layer 16 is formed on the glass substrate 12. Alternatively, the present invention can also be applied to processing of an information recording medium and an information recording and/or reproducing apparatus which include a magnetic thin layer, e.g., a magnetic disc such as a hard disc, a magnetooptical disc, a magnetic tape, and a magnetic head, as well as processing of a product such as a semiconductor product.

EXAMPLE

As described in the above embodiment, the sample 10 was processed. The thickness of the magnetic thin layer 16 was approximately 25 nm; the thickness of the intermediate layer 18 was approximately 40 nm; the thickness of the first mask layer 20 was approximately 15 nm; and the thickness of the second mask layer 22 was approximately 130 nm.

When a pattern, in which a pitch was approximately 200 nm and a ratio of a line to a space was approximately 3:1 (i.e., the line width was approximately 150 nm and the space width was approximately 50 nm), was formed on the second mask layer 22 by exposure and thereafter development was performed, grooves having vertical side faces were formed.

Figure 17:
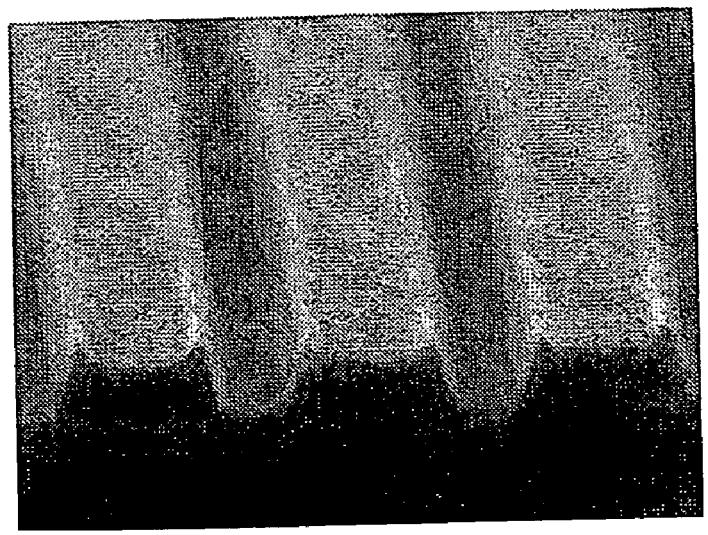
[FIG. 17] is a photomicrograph showing the processed shape of the first mask layer in a sample of Example according to the present invention.

Then, when the first mask layer 20 on the bottom face of the groove was removed by ion beam etching, a step portion 21 was formed along the peripheral portion of the first mask layer 20, as shown in FIG. 17. In the ion beam etching, a beam voltage was adjusted to 500V and a beam current was adjusted to 500 mA.

Figure 18:
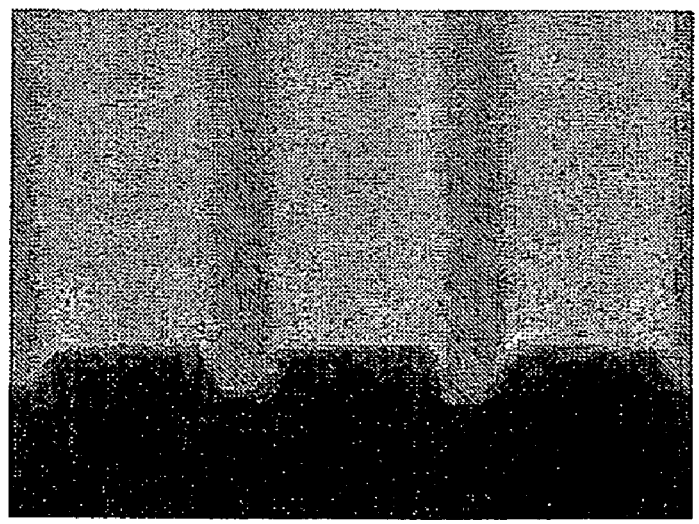
[FIG. 18] is a photomicrograph showing the shape of a recording element in the same sample.

Next, the intermediate layer 18 on the bottom face of the groove was removed by reactive ion etching using $SF_6$ gas as a reactive gas under a condition in which a source power was 1000 W and a bias power was 150 W. Then, while the source power and the bias power were adjusted to 1000 W and 250 W, respectively, reactive ion etching using CO gas and $NH_3$ gas as a reactive gas was performed, thereby the magnetic thin layer 16 on the bottom face of the groove was removed. Thus, the magnetic thin layer 16 was divided into recording elements 16A. Finally, while the source power and the bias power were adjusted to 1000 W and 50 W, respectively, reactive ion etching using $SF_6$ gas as a reactive gas was performed, thereby the intermediate layer 18 left on the recording element 16A was removed. As show in FIG. 18, it was confirmed that the recording element 16A was processed in an angular shape in which the peripheral portion was not rounded.

COMPARATIVE EXAMPLE

Unlike Example described above, no intermediate layer 18 was formed. The first mask layer 20 was formed of TiN (titanium nitride) and was processed by reactive ion etching using $SF_6$ gas as a reactive gas. The source power and the bias power were adjusted to 1000 W and 150 W, respectively. Moreover, the thickness of the second mask layer 20 was approximately 250 nm. Except for the above, the sample 10 was processed under the same conditions as those of Example described above.

Figure 19:
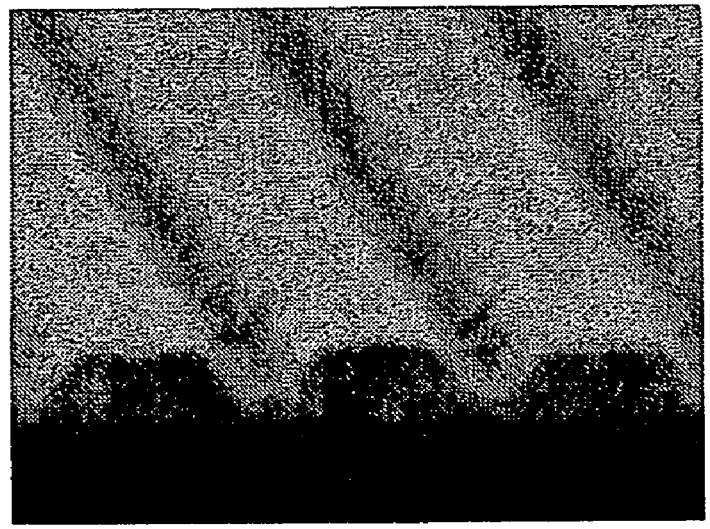
[FIG. 19] is a photomicrograph showing the processed shape of the first mask layer in a sample of Comparative Example.

As shown in FIG. 19, no step portion was formed along the peripheral portion of the first mask layer 20 that was processed by reactive ion etching. Instead, the peripheral portion of the first mask layer 20 was slightly rounded.

Figure 20:
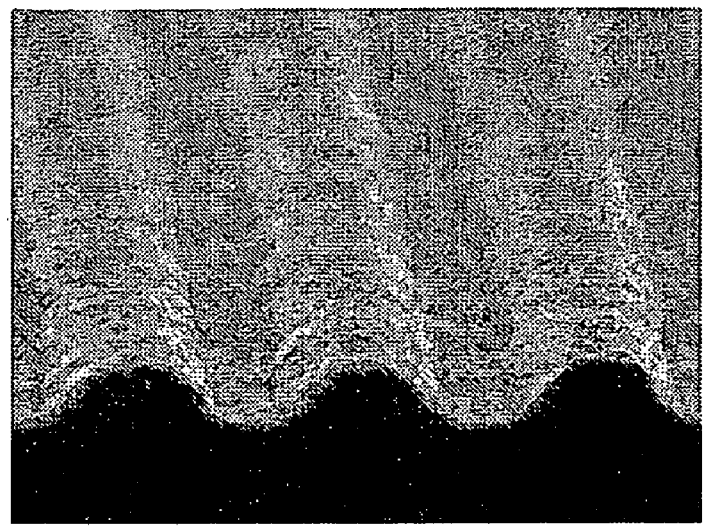
[FIG. 20] is a photomicrograph showing the shape of a recording element in the same sample.
Figure 21:
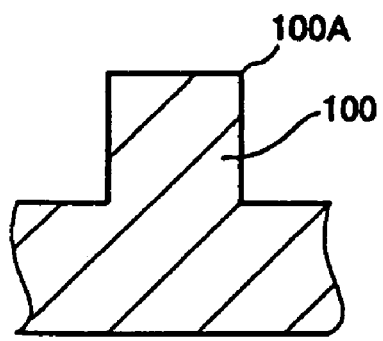
[FIG. 21A] is a side cross-sectional view schematically showing an ideal shape of a layer to be processed.
[FIG. 21B] is a side cross-sectional view schematically showing an actual shape of mask layer of which peripheral portions are removed faster than the other portions by conventional dry etching.
[FIG. 21C] is a side cross-sectional view schematically showing an actual shape of layer to be processed of which peripheral portions are exposed from the mask layer faster than the other portions by conventional dry etching.
[FIG. 21D] is a side cross-sectional view schematically showing an actual shape of the layer to be processed by conventional dry etching.
Figure 21:
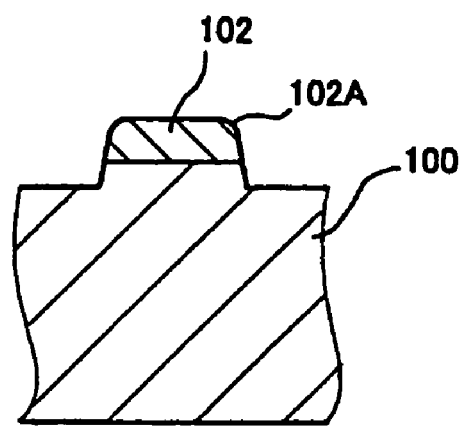
Figure 21:
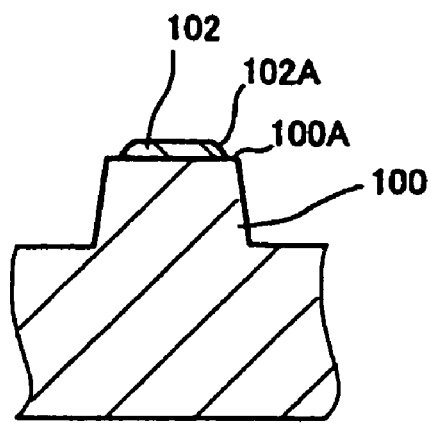
Figure 21:
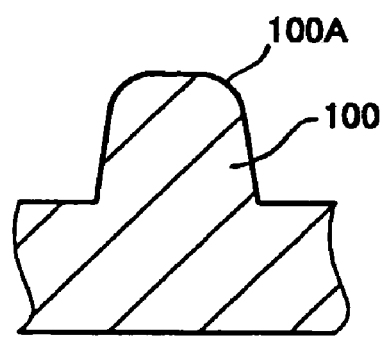

Moreover, the recording element 16A that was finally obtained was slightly rounded in its peripheral portion, as shown in FIG. 20. That is, the recording element 16A was processed to have an approximately semicircular cross section.

As described above, in a case of the conventional dry etching method, the peripheral portion of the layer to be processed is often processed in a rounded shape. In other words, it is more likely that a product such as an information recording medium, in which a layer to be processed such as an information recording layer, has a peripheral portion of an angular shape was processed by the dry etching method of the present invention.

Especially, a product, in which a layer to be processed was processed by reactive dry etching and has a peripheral portion of an angular shape, can be estimated as a product that has been processed by the dry etching method of the present invention.

INDUSTRIAL APPLICABILITY

As described above, the present invention can provide an excellent effect that a layer to be processed can be processed in a fine pattern to have a peripheral portion of an angular shape.

The invention claimed is:

1. A dry etching method comprising:
a starting structure preparing step of preparing a starting structure including a layer to be processed, an intermediate layer, a first mask layer and a second mask layer, these layers being arranged in this order;
a second mask layer processing step of processing the second mask layer in a predetermined pattern;
a first mask layer processing step of removing the first mask layer on a bottom of a groove of the pattern by dry etching while particles removed and scattered from the first mask layer adhere to a side face of the second mask layer;
an intermediate layer processing step of removing the intermediate layer on a bottom of the groove of the pattern by dry etching and forming a step portion along a peripheral portion of the intermediate layer corresponding to an outline of the pattern following the particles adhering to the side face of the second mask layer, the step portion projecting toward an opposite side to the layer to be processed;
a layer-to-be-processed processing step of removing the layer to be processed on a bottom of the groove by dry etching to process the layer to be processed in the pattern; and
an intermediate layer removal step of removing substantially completely the intermediate layer on the layer to be processed after the layer-to-be-processed processing step,
wherein the first mask layer does not remain on the intermediate layer at the end of the layer-to-be-processed processing step.

2. The dry etching method according to claim 1, wherein in the first mask layer processing step, the first mask layer on the bottom of the groove is removed by ion beam etching.

3. The dry etching method according to claim 2, wherein the first mask layer processing step sets at least one of an etching condition that is adjustment of a beam voltage of the ion beam etching and an etching condition that is selection of a type of a gas, to control a shape of the step portion.

4. The dry etching method according to claim 3, wherein the second mask layer processing step uses a resist material as a material for the second mask layer.

5. A method for manufacturing an information recording medium comprising: a step of dividing an information recording layer into a number of recording elements by using the dry etching method according to claim 3 while the information recording layer is regarded as the layer to be processed.

6. The dry etching method according to claim 2, wherein the second mask layer processing step uses a resist material as a material for the second mask layer.

7. A method for manufacturing an information recording medium comprising: a step of dividing an information recording layer into a number of recording elements by using the dry etching method according to claim 6 while the information recording layer is regarded as the layer to be processed.

8. A method for manufacturing an information recording medium comprising: a step of dividing an information recording layer into a number of recording elements by using the dry etching method according to claim 2 while the information recording layer is regarded as the layer to be processed.

9. A method for manufacturing an information recording medium comprising: a step of dividing an information recording layer into a number of recording elements by using the dry etching method according to claim 1 while the information recording layer is regarded as the layer to be processed.

10. The dry etching method according to claim 1, wherein the layer-to-be-processed processing step starts with the step portion projecting farthest toward the opposite side to the layer to be processed.

11. A method for manufacturing an information recording medium comprising:
a step of dividing an information recording layer into a number of recording elements by using the dry etching method according to claim 10 while the information recording layer is regarded as the layer to be processed.

* * * * *